Patented Jan. 6, 1953

2,624,745

UNITED STATES PATENT OFFICE 2,624,745

PROCESS FOR THE MANUFACTURE OF ESTERS OF THIOPHOSPHORIC ACID

Gerhard Schrader, Opladen-Bruchhausen, Germany, assignor to Farbenfabriken Bayer, Leverkusen, Germany No Drawing. Application March 26, 1949, Serial No. 83,781. In Switzerland April 7, 1948

7 Claims. (Cl. 260—346)

1

The present invention relates to a new process of preparing esters of thiophosphoric acid. More particularly the invention relates to the manufacture of aromatic esters of dialkoxy thiophosphoric acids. These compounds are of particular value on account of their strong insecticidal properties.

The processes hitherto applied for the manufacture of esters of this type showed various disadvantages. Thus the yields were not satisfactory, the products were not sufficiently pure and contained undesired by-products, which not seldom altered the chemical as well as the physiological quality of the compounds. This was mainly due to a prolonged heating of the reaction mixture at comparatively high temperatures, this being necessary to complete the reaction. A process of this kind which became recently known consists in heating in an indifferent solvent a dialkyl thiophosphoryl chloride with a substituted phenol in the presence of an acid binding agent; as an equivalent the phenol may be used in the form of a phenate, e. g. as a sodium phenate. The temperature applied was as a rule between 120 and 140° C., the reaction time was several hours and amounted—in the large scale process—up to 10 hours and more.

It has now been found that aromatic esters of dialkyl thiophosphoric acids can be obtained at lower temperature in much shorter time in higher yields and greater purity when the reaction is carried through in the presence of metallic copper. As in the known process a dialkyl thiophosphoryl chloride and a phenol are mixed with the addition of an acid binding agent such as soda ash, calcium carbonate, sodium cyanide, pyridine and others. Preferably an inert solvent such as benzene or chlorobenzene is added. Instead of the phenol and an acid binding agent, the phenol may be used in the form of a phenate, e. g. as sodium phenate. To this mixture copper is added in any suitable form; it may be e. g. copper powder, but also a copper reaction vessel may be used. By this expedient the reaction time is essentially shortened, and as a rule about 5 hours are sufficient to complete the reaction at temperatures, which are not essentially above 100° C. and preferably lie below this temperature, e. g. between 80 and 95° C. The yields are increased to 90% and more, and the reaction products are practically free from the undesired by-products. The compounds thus obtained show when applied in pesticidal compositions a higher lime-stability and a lower toxicity towards warm-blooded animals in comparison with the impure products

2 on the market prepared by known processes, which latter were mostly not lime-stable and required special precautions on account of their higher toxicity towards warm-blooded animals.

The invention is illustrated by the following examples; it is, however, not limited thereto.

Example 1

139 g. of p-nitrophenol are suspended in a stirring flask with 400 cc. of chlorobenzene, and 70 g. of soda ash, 2 g. of metallic copper and 1 g. of potassium bromide are added. Then 190 g. of diethyl thiophosphoryl chloride are added with stirring to the mixture at a temperature of 80° C. Reaction takes place immediately, whereby the temperature of the reacting mixture rises to 90–95° C. The mixture is stirred for further 5 hours at 85–90° C., and is then worked up. In this manner 265–270 g. of the p-nitrophenyl ester of diethyl thiophosphoric acid are obtained. Yield 90% of theory. The product thus obtained is of slightly reddish-yellow color and is practically free from by-products.

Example 2

278 g. of p-nitrophenol are suspended in 800 cc. of chlorobenzene. Then 150 g. of soda ash, 3 g. of copper powder and 2 g. of potassium bromide are added. Within 5 minutes 330 g. of dimethyl thiophosphoryl chloride are added with stirring to the mixture at a temperature of 80° C. The reaction starting immediately causes the inside temperature to rise to 90–95° C. The mixture is stirred for further 5 hours at a temperature of 85–90° C., and is then worked up in the usual manner. Thus 450 g. of the p-nitrophenyl ester of dimethyl thiophosphoric acid are obtained boiling at 158° C. under 2 mm. pressure. Yield 85.5% of theory.

Example 3

88 g. of β-methylumbelliferone of the formula:

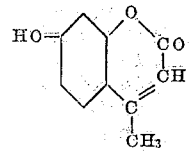

are suspended in 1200 cc. of chlorobenzene. Then 50 g. of potassium carbonate, 2 g. of copper powder and 1 g. of potassium bromide are added. 95 g. of diethyl thiophosphoryl chloride are added with stirring to the mixture at 80° C. The temperature is kept for further 9 hours at 95–100° C.

The mixture is then worked up in the usual manner. Thus 100 g. of ester melting at 38° C. are obtained, corresponding to a yield of 72%.

Example 4

176 g. of β-methylumbelliferone are suspended in 1200 cc. of chlorobenzene. Then 110 g. of potassium carbonate (dry) and 7 g. of copper powder are added. 175 g. of dimethyl thiophosphoryl chloride are added to the mixture with stirring at 80° C. The temperature is kept at 90° C. for 6 hours with stirring. After the salts are sucked off and after distilling off the solvent a residue remains which rapidly solidifies to crystals. 250 g. of reaction product are obtained corresponding to a yield of 83% of theory. The new compound crystallizes from methanol in colorless prisms melting at 77° C.

Example 5

14 g. of 7-hydroxy-coumarin are suspended in 200 cc. of chlorobenzene. Then 12 g. of potassium carbonate and 100 mg. of copper powder are added at 70° C., and into this mixture 19 g. of diethyl thiophosphoryl chloride are introduced with stirring at a temperature of 100° C. After 8 hours the reaction product is worked up in the usual manner. Thus 12 g. of diethyl thiophosphoric acid ester of 7-hydroxy-coumarin are obtained, melting at 46° C.

Example 6

88 g. of 6-hydroxy-4-methyl-coumarin are suspended in 600 cc. of chlorobenzene. Then 55 g. of potassium carbonate and 1 g. of copper powder are added at 70° C. 88 g. of dimethyl thiophosphoryl chloride are introduced into this mixture with stirring at a temperature of 90–100° C. The temperature is kept for further 6 hours at 90–100° C. On working up in the usual manner 60 g. of dimethyl thiophosphoric acid ester of 6-hydroxy-4-methyl-coumarin are obtained. The new compound is a viscous oil.

Example 7

18 g. of 6-hydroxy-4-methyl-coumarin are suspended in 300 cc. of chlorobenzene. 15 g. of potassium carbonate and 3 g. of copper powder are added. 19 g. of diethyl thiophosphoryl chloride are introduced into the mixture at 100° C. with stirring. The temperature is kept for further 10 hours at 105° C. After working up 21 g. of diethyl thiophosphoric acid ester of 6-hydroxy-4-methyl-coumarin are obtained. The product obtained is a viscous oil.

I claim:

1. In a process of manufacturing aromatic esters of dialkyl thiophosphoric acid from dialkyl thiophosphoryl chlorides and compounds from the group consisting of phenates and phenols in the presence of an acid binding agent the improvement which consists in reacting the components in the presence of metallic copper.

2. In a process of manufacturing aromatic esters of dialkyl thiophosphoric acid from dialkyl thiophosphoryl chlorides and compounds from the group consisting of phenates and phenols in the presence of an acid binding agent the improvement which consists in reacting the components in the presence of metallic copper at temperatures up to and not essentially above 100° C.

3. In a process of manufacturing aromatic esters of dialkyl thiophosphoric acid of high insecticidal value from dialkyl thiophosphoryl chlorides and compounds from the group consisting of negatively substituted phenols and hydroxy-coumarins in the presence of an acid binding agent, the components being dissolved or suspended in an inert solvent, the improvement which consists in reacting the components in the presence of metallic copper.

4. In a process of manufacturing aromatic esters of dialkyl thiophosphoric acid of high insecticidal value from dialkyl thiophosphoryl chlorides and compounds from the group consisting of negatively substituted phenols and hydroxy-coumarins in the presence of an acid binding agent, the components being dissolved or suspended in an inert solvent, the improvement which consists in reacting the components in the presence of metallic copper at temperatures up to and not essentially above 100° C.

5. In a process of manufacturing aromatic esters of dialkyl thiophosphoric acid of high insecticidal value from dialkyl thiophosphoryl chlorides and compounds from the group consisting of negatively substituted phenols and hydroxy-coumarins in the presence of an acid binding agent, the components being dissolved or suspended in an inert solvent, the improvement which consists in reacting the components in the presence of metallic copper at temperatures between about 80 and about 100° C.

6. In a process of manufacturing the p-nitrophenol ester of diethyl thiophosphoric acid by reacting p-nitrophenol with diethyl thiophosphoryl chloride in the presence of an acid binding agent, the components being suspended in chlorobenzene, the improvement which consists in reacting the components in the presence of metallic copper at temperatures between about 85 and 95° C.

7. In a process of manufacturing the diethyl thiophosphoric acid ester of β-methylumbelliferone by reacting diethyl thiophosphoryl chloride with β-methylumbelliferone in the presence of an acid binding agent, the components being suspended in chlorobenzene, the improvement which consists in reacting the components in the presence of metallic copper at temperatures between 80 and 100° C.

GERHARD SCHRADER.

REFERENCES CITED

The following references are of record in the file of this patent:

UNITED STATES PATENTS

| Number | Name | Date |
|---|---|---|
| 1,844,408 | Nicolai | Feb. 9, 1932 |
| 1,995,247 | Haring | Mar. 19, 1935 |
| 2,005,619 | Graves | June 18, 1935 |
| 2,471,464 | Toy | May 31, 1949 |

OTHER REFERENCES

Ser. No. 188,058, Dorr et al. (A. P. C.), published June 15, 1943.

Mfg. Chem. & Perfumer, December 1948, XIX, 12, pages 548–9.